June 3, 1958     H. J. TROCHE     2,837,312
AUTOMATIC JACK

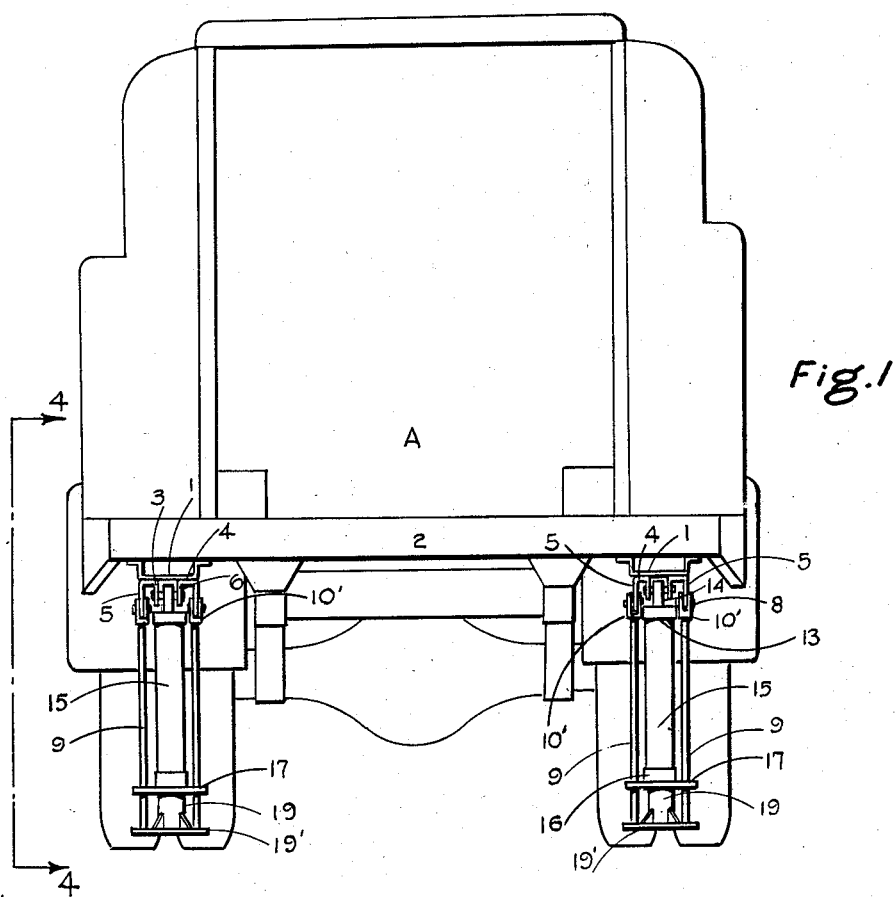
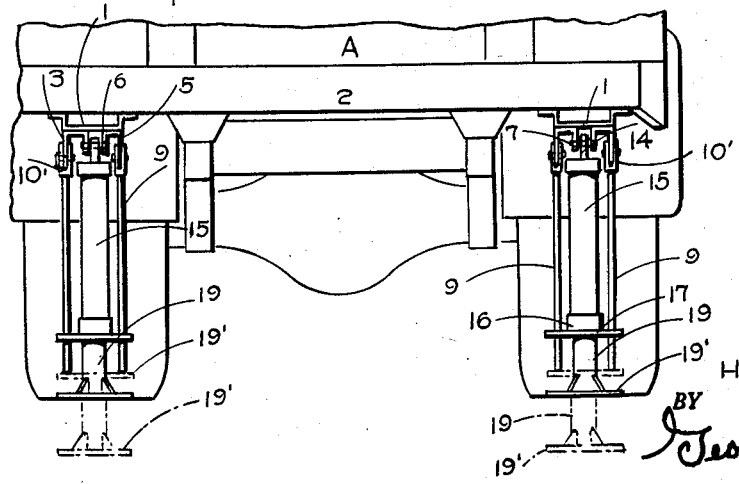

Filed Oct. 4, 1954     3 Sheets-Sheet 2

INVENTOR.
HERMAN J. TROCHE
BY
George W. Soywell
ATTORNEY

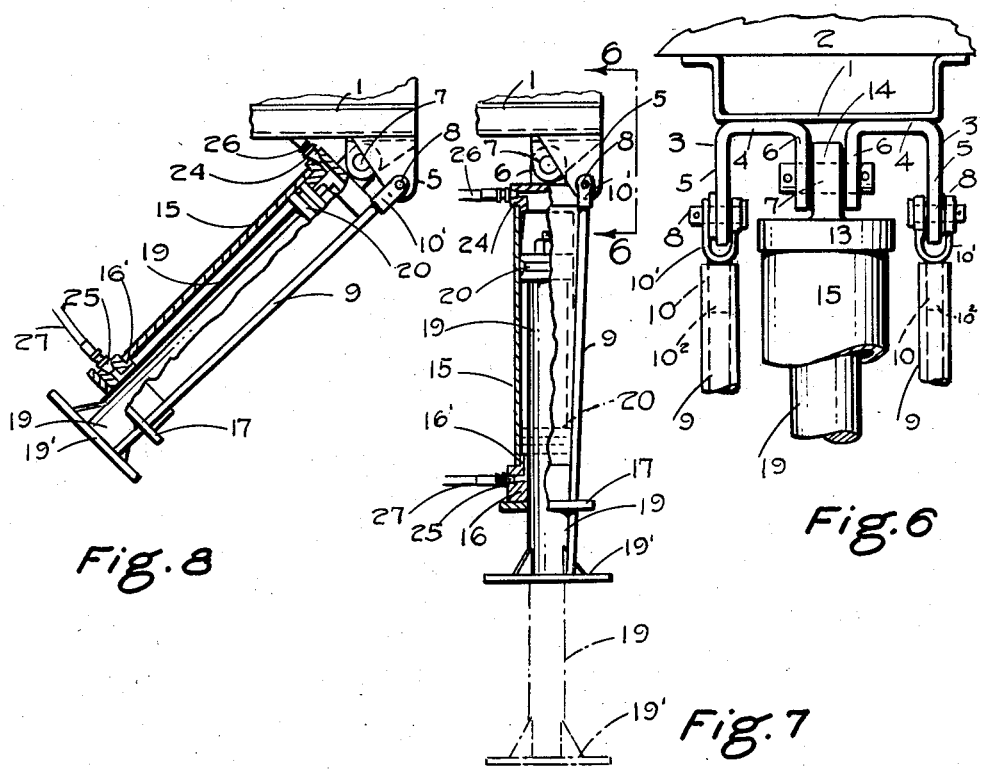
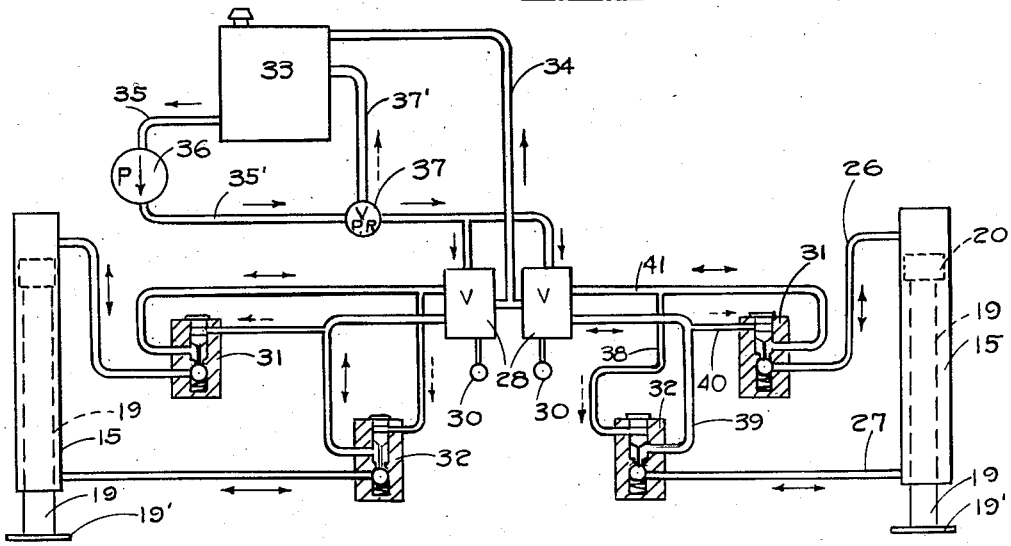

United States Patent Office 2,837,312
Patented June 3, 1958

2,837,312
AUTOMATIC JACK

Herman J. Troche, Fairview Park, Ohio, assignor to J. H. Holan Corporation, Cleveland, Ohio, a corporation of Ohio Application October 4, 1954, Serial No. 460,220

2 Claims. (Cl. 254—86)

The invention relates to jacks, and particularly to devices of this character which are automatically actuated by fluid pressure into operative and stored positions.

Although the improved jack is applicable for use with many devices adapted to be supported thereby, it will be herein described and is shown in the accompanying drawings as used for steadying and supporting a utility truck. These trucks are primarily used for the installation and maintenance of the facilities of public utility organizations and are often positioned on uneven and sloping terrain where special means for holding the truck steady are required. Furthermore, much of the heavy work performed by various accessories of the utility truck, such as derricks, ladders, etc., places so heavy a load on the rear of the truck that the latter would be tilted off from its front wheels if support, such as given by the jacks, were not provided.

The annexed drawings and the following description set forth in detail mechanism illustrating one form of the improved automatic jack, such means showing, however, only one of the various forms in which the principle of the invention may be embodied.

In said annexed drawings:

Figure 1 is a rear elevation of the body of a utility truck to which the improved automatic jack has been applied, the view showing a jack upon each side of the rear of the truck in an intermediate position occupied by the jack between supporting and stored positions;

Figure 2 is a rear elevation, similar to Figure 1, in which a position of the jack is shown immediately preceding the position shown in Figure 1, or subsequent thereto, dependent upon whether the jack is being actuated into stored position or into operative position, there also being suggested in broken lines in this view the positions of the jack when the latter is fully extended into steadying and supporting position, and also in intermediate position shown in Figure 1;

Figure 6 is a fragmentary rear elevation, upon an enlarged scale, taken from the plane indicated by the line 6—6, Figures 3 and 7;

Figure 7 is a fragmentary elevation, partially in section and upon an enlarged scale, the view being similar to Figure 4, there also being indicated in dot-and-dash lines a ground-engaging operative position of the jack;

Figure 8 is a fragmentary elevation similar to the full line showing of Figure 5 and upon an enlarged scale, the view being partially in section; and Figure 9 is a schematic showing of the fluid pressure system for operating the jack.

Figure 3:
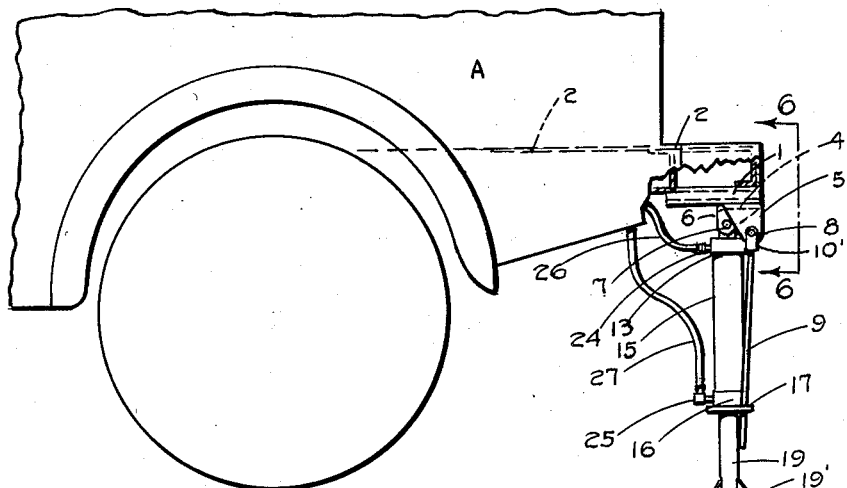
Figure 3 is a fragmentary side elevation of the structure shown in Figure 1 when the jack is fully extended, the view being partially broken away and in section.
Figure 4:
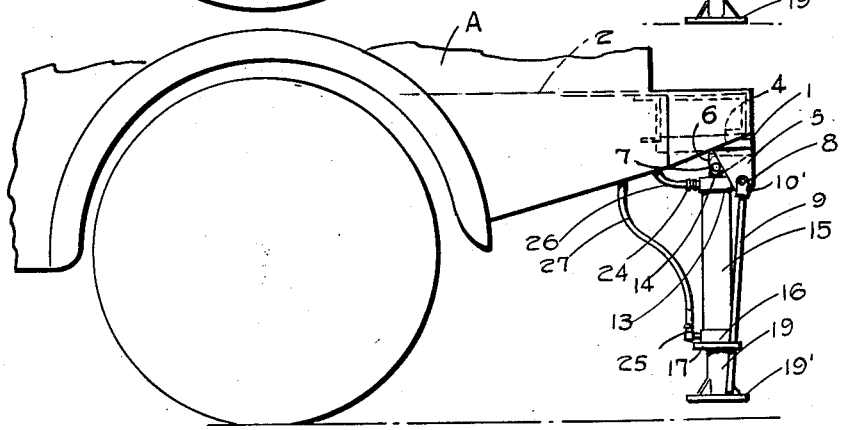
Figure 4 is a fragmentary side elevation, taken from the plane indicated by the line 4—4, Figure 1.

Referring to the annexed drawings in which the same parts are indicated by the same respective members in the several views, a pair of the improved jacks, Figures 1 and 2, are secured to the sides and adjacent the rear of the body A of a utility truck. Each of the jacks upon the two sides of the body A is of the same construction and actuated in the same manner so that only one thereof will be described. However, these two jacks are not necessarily concurrently operated nor are they necessarily actuated to the same degree since the condition and contour of the ground upon which they may be placed may vary considerably from side to side of the truck body thus requiring a modified use of the jack upon one side of the body as compared to the use of the jack upon the opposite side of the body. In fact, a duplex control system is shown in Figure 9 whereby independent actuation of each jack is effected. Fluid pressure is utilized for the power necessary to position the jacks either for use or for storage, and a double control valve forms a part of the equipment for these purposes. This fluid power system will be described hereinafter somewhat in detail.

Secured to the underside of the truck body platform 2 are channels 1, Figure 6, from which the improved jacks depend. For this purpose there are secured to the bottom face of each channel 1 an opposed pair of reversely-mounted U-like members 3 having webs 4, depending outside comparatively long legs 5 and depending inside comparatively short legs 6, the short legs 6 being spaced apart and having confronting faces. Mounted in the opposed short legs 6 is a pin 7 and mounted in each of the long legs 5 is a pin 8.

Pivotally secured to and depending from the pins 8 are tubular links 9, the precise connection of the links 9 to the pins 8 being effected by rods 10 having U-shaped upper ends 10' which are pivotally hung on the pins 8 and cylindrical lower ends $10^2$ secured in the top portions of the tubular links 9. These tubular links 9 incline in a downward direction forwardly of the truck body A, as particularly shown in Figure 3, and pass through and downwardly of a plate 17 relative to which they are slidable, this plate 17 being secured to and beneath a tubular block 16 forming a base for a double-acting cylinder 15. This cylinder is suspended symmetrically between the links 9 by an upwardly-extended hanger 14 pivotally secured to the pin 7, the hanger 14 being upwardly extended from a cap 13 which is secured to and forms a top for the cylinder 15.

The bottom end of the cylinder 15 consists of the tubular block 16 mounted on the top surface of the plate 17. The block 16 has an inner upper annular flange 16' to the exterior face of which the bottom of the cylinder 15 is secured. Within the cylinder 15 and projecting downwardly through its bottom and the plate 17 and extending therefrom beyond the bottom ends of the links 9 is a piston 19 having adjacent its top end a peripheral surrounding spool-like ring 20 snugly slidably engaging the inner surface of the cylinder 15. Therefore, pressure applied to the respective top and bottom faces of the spool 20 will move the upper part of the piston 19 downwardly and upwardly in the cylinder 15 between the top of the latter and the flange 16' of the block 16.

Fluid pressure for movements of the piston 19 is obtained through upper cylinder port 24 and lower cylinder port 25 communicating respectively by oil lines 26 and 27 with a control valve 28, Figure 9. The lower cylinder port 25 intersects the block 16. The control valve 28 is governed by the movements of manually operable handles 30 for feeding of fluid pressure through the line 26 and the upper port 24 to the top of the cylinder 15 and outwardly from the latter to the control valve 28 through the lower port 25 and the oil line 27, or vice versa. Whichever way the fluid is flowing, either into the top of the cylinder 15 and outwardly therefrom at the btoom, or vice versa, pilot-operated check valves 31 and 32 are provided, one of the valves for each direction of fluid travel.

Figure 5:
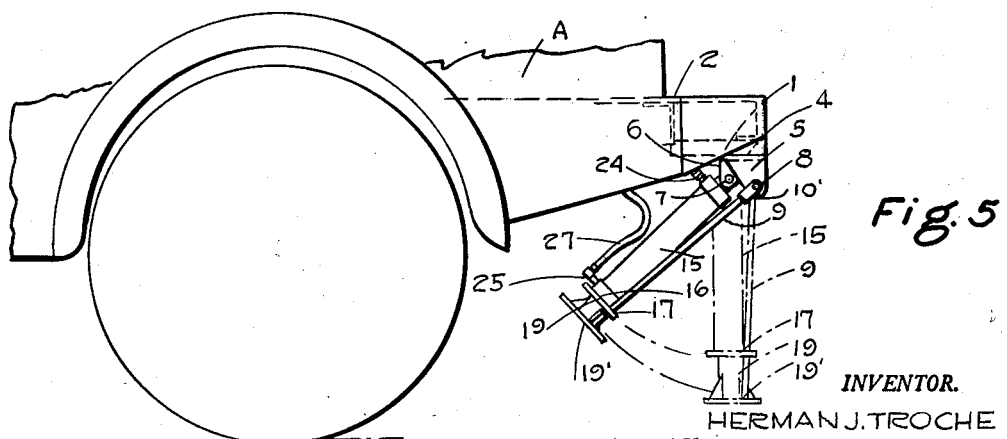
Figure 5 is a fragmentary side elevation showing the stored position of the jack, the position from which the jack has moved immediately preceding its movement into stored position being indicated by dot-and-dash lines.

From the aforegoing description and by reference to the accompanying drawings, it is evident that fluid pressure applied through the line 27 will lift the piston 19 and cause the discharge of oil from the top of the cylinder 15 through the oil line 26. Assuming that the jack is in operative position, such as shown in dot-and-dash lines in Figure 7, this piston movement will retract the jack from the ground-engaging position first into the position wherein a ground plate 19' engages the bottom ends of the links 9, as appears in full lines in Figure 7. Due to the downward inclination of the links 9 inwardly toward the vertically depending cylinder 15, any further upward movement of the piston 19 will effect a swinging movement of the jack toward the stored position shown in full lines in Figures 5 and 8. Vice versa, movement of the jack toward active position is effected by the passage of fluid pressure through the line 26 into the top of the cylinder 15 and a consequent movement of oil from the bottom of the cylinder 15 through the line 27.

Referring to the schematic showing of the fluid pressure system appearing in Figure 9, it will be noted that it provides for independent actuation of the two jacks, there being a separate system for each jack beyond a compound control valve 28 having actuating handles 30, each system communicating with a reservoir 33 by a line 34 and by a return line 35 having as parts thereof the pump 36, the high pressure line 35', and a pressure relief valve and line 37 and 37'.

The fluid pressure system is designed to lock the oil in the double acting cylinders 15 when it is desired that there should not be flow of oil to and from the cylinders. This locking of the oil in the cylinders 15 is effected by pilot-operated check valves 31 and 32, valve 31 communicating with the bottom of the control valve 28 when oil is flowing through line 27 into the bottom of the cylinder 15, and valve 32 communicating with the top of the control valve 28 and the top of the cylinder 15 when oil is flowing into the top of the latter. In other words, assuming that it is desired to pass the oil from the top of the control valve 28 to the top of the cylinder 15 via line 41, a bypass line 38 depresses a spring-mounted ball piston of the pilot operated check valve 32 whereby oil can flow from the bottom of the cylinder 15 through the line 27 into the check valve 32 and thence through the line 39 to the bottom of the control valve 28. Contrariwise, when it is desired to pass oil from the bottom of the control valve 28 into the bottom of the cylinder 15 through the lines 39 and 27, a branch line 40 to the pilot-operated check valve 31 effects depression of the spring-mounted ball piston thereof so that oil leaving the top of the cylinder 15 through the line 26 can enter and pass through the valve 31 and thence by line 41 pass into the top of the control valve 28.

The improved jack hereinbefore described and shown in the accompanying drawings is quickly self-positioning, will level the rear of the truck body, is suitable for raising the rear body wheels, eliminates any crawling under the truck body for jack operation, requires no retaining pins and, due to the simplicity by which it is lever-controlled, promotes the use thereof by linemen working with the truck body.

What I claim is:

1. A jack, for use with a structure to which it is secured and which it is designed to support, comprising a cylinder pivotally secured adjacent one end to and depending from the structure, a base upon one face of which the cylinder is mounted at its opposite end, a plate secured to the opposite face of the base, a link pivotally secured at one of its ends to the structure, downwardly inclined toward the cylinder, and passed through and extended from the plate at its other end and slidable relative thereto; a reciprocable piston for the cylinder having a head member snugly slidably engageable with the inner surface of the cylinder, the piston having its opposite end passed through and extended from the cylinder base and the plate, means feeding fluid pressure into the cylinder and selectively against the opposed faces of the piston head member, and a ground plate for the piston movable into engagement with the extended end of the link when the piston is moved upwardly, to urge the link upwardly relative to the plate, the ground plate moving away from said link end when the piston is moved downwardly.

2. A jack, characterized as in claim 1, in which there is an opposed pair of links, in which the cylinder depends from the structure centrally of said pair of links, in which the links are secured to the structure by respective channel members from which the links respectively pivotally depend, said channel members having spaced confronting faces from which the cylinder pivotally depends.

References Cited in the file of this patent

UNITED STATES PATENTS

| 1,524,083 | Clement | Jan. 27, 1925 |
| 1,988,304 | Duman | Jan. 15, 1935 |
| 2,196,510 | Vutz | Apr. 9, 1940 |
| 2,452,110 | Dourte | Oct. 26, 1948 |
| 2,684,641 | Warf | July 27, 1954 |